Patented Nov. 28, 1933

1,937,291

UNITED STATES PATENT OFFICE 1,937,291

PROCESS OF RECOVERING NEUTRAL GREASE FROM WOOL WASHING WATER

Eugène Mertens, Louvain, Belgium

No Drawing. Application September 11, 1930, Serial No. 481,357, and in Belgium November 23, 1929

3 Claims. (Cl. 87—6)

The object of my present invention is to provide an improved process of recovering the neutral grease contained in the complex concentrates obtained by various processes of concentration of wool washing water.

It is well known that wool washing water contains not only grease but also fatty acids in the form of soaps, albumenoid substances and various mineral and organic impurities.

It has been found that it is not practical to treat such water directly by heat and pressure, because the masses to be submitted to the process are very voluminous and the expense of heat is excessive, and also because, precisely owing to the heterogeneous composition of the wool washing water, chemical combinations will be produced, said combinations being capable of adulterating the constituents recovered, which is particularly objectionable with relation to the grease of wool, because the refining of the latter, owing to this fact, will be either impossible or at least very complicate and expensive.

For these reasons attempts have been made with a view of obtaining by a first inexpensive operation, concentrates containing high proportions of grease and from which certain impurities are already removed. Thus, according to methods, certain of which are or have been patented, there is produced by churning the water or injecting compressed air into the same a frothy concentrate, or by means of a reacting agent such as lime, calcium chloride, sulphuric acid and the like, a precipitated concentrate or a colloidal concentrate, if a colloid, such as fecula, clay and the like is used as a precipitating agent.

In order to recover the grease contained in these various concentrates, a number of physical, chemical and thermic processes have been proposed. Among the physical processes there is one using the hydroextractors for precipitating and agglutinating the particles of grease by centrifugal force, and others using cold or hot filters under pressure. These processes are very objectionable in that very intimate physical combinations of grease and impurities are produced, whereby the refining of the grease will be complicated. Some chemical processes consist in treating the concentrates by means of a suitable agent, frequently under the influence of a determined temperature. These processes are objectionable in that the grease is adulterated and they are very expensive because they require a plurality of subsequent operations for recovering the agent used. With respect to the thermal processes, it is well known to treat the concentrates in open tanks under the influence of certain temperatures. These processes are objectionable in that certain components, particularly neutral grease, form emulsions by the action of heat which it is impossible to separate subsequently.

In British Patent No. 273,642, granted to me, is described and claimed a process of treating frothy concentrates in a digester under a pressure which corresponds to the temperature to which the water is heated.

Now I have carefully considered the intimate nature of the various concentrates and found the following data:

1. The precipitated concentrates in general are not fusible at atmospheric pressure.

2. The separation of the constituents of different concentrates or concentrates obtained by different methods does not take place under the same temperatures.

3. In the case of frothy concentrates, it is desirable to apply the pressure before the temperature attains its final value, in order to stabilize the volume of concentrates to be treated, and in order to avoid, at the beginning and/or at the end of the operation, the objections inherent to the thermal treatment in an open tank.

The main entirely novel characteristic feature of the process of my present invention is the treatment of the concentrates in a digester the temperature and pressure being adjusted separately and independently by any known means in order to avoid the prejudicial combinations of various constituents.

My improved process has also the advantage of being economical. Thus for treating concentrates requiring a pressure of 3–4 kilograms within the digester, that is a little more than 4 kilograms of pressure of the heating steam, it has been sufficient to heat such concentrates to 90–100° C., that is 1 kilogram of heating steam pressure and complete the pressure within the digester by introducing a little volume of air, whereby about 40% of heat will be saved.

The possibility of treating the product at a minimum temperature results also in a particularly important advantage because the grease will not be altered as in the treatment at relatively high temperatures.

The process may be carried into effect by known means, for instance by introducing compressed air, oxygen or any other suitable gas into the digester prior to the heating of the latter, or by introducing into the digester the concentrate by means of a pump forcing it under pressure and producing the desired pressure in the digester.

A practical method consists in heating the concentrate to a temperature slightly below the critical temperature (that is the temperature at which the prejudicial combinations are produced) prior to its introduction into the digester, or heating the concentrate in the open digester to a temperature slightly below the critical temperature. In this way the gases contained in the concentrate will be quickly disengaged and the desired pressure may be obtained before reaching the critical temperature. The critical temperature is the temperature at which emulsion occurs depending on the nature of the precipitates treated. In other words, it is the temperature at which chemical reactions take place in the mass and is normally lower than the boiling point of the water contained in the precipitates, consequently the treatment must be at temperatures lower than 100° C.

Having now fully described my said invention, what I claim and desire to secure by Letters Patent, is:

1. The improved process of treating concentrates obtained from wool washing water in a digester, which consists in heating the concentrate in the digester at a temperature comprised between 90° and 100° C., and increasing the pressure above the atmospheric pressure within the digester with relation to such temperature by introducing suitable compresesd gas into the digester.

2. The improved process of treating concentrates obtained from wool washing water in a digester, which consists in heating the concentrate in the open digester up to a temperature comprised between 90° and 100° C., then closing the digester and increasing the pressure above the atmospheric pressure within the digester by external means independently from such temperature.

3. The improved process of treating concentrates obtained from wool washing water in a digester, which consists in heating the concentrate in an open tank to a temperature comprised between 90° and 100° C., forcing the heated concentrate under pressure above the atmospheric pressure into the digester, and maintaining the concentrate at said temperature.

EUGÈNE MERTENS.